UNITED STATES PATENT OFFICE 2,494,758

CONDENSATION OF ALDEHYDES WITH AROMATICS OR THIOPHENES IN THE PRESENCE OF GLAUCONITE

Howard D. Hartough, Pitman, and John J. Sardella, Woodbury, N. J., assignors to Socony-Vacuum Oil Company, Incorporated, a corporation of New York No Drawing. Application April 26, 1946,
Serial No. 665,315

6 Claims. (Cl. 260—67)

The present invention relates to the condensation of hydrocarbons with carbonyl compounds and, more particularly, to the condensation of aromatic hydrocarbons with carbonyl compounds in the presence of a cheap, readily separable solid catalyst.

The condensation of aromatic hydrocarbons with various carbonyl compounds, especially aldehydes, in the presence of various catalysts has long been practiced. In the prior art there are many descriptions of methods for carrying out the condensation of aromatic compounds with carbonyl compounds employing sulfuric acid, metal chlorides, such as ferric chloride, aluminum chloride and zinc chloride, and acetic acid solutions of such metal chlorides. More recently it has been shown that the hydrogen halides, and more particularly hydrogen fluoride, may be used to accelerate this condensation. In other words, the catalysts of the prior art are either acids or salts having an acid reaction. It now has been discovered that in contrasts to the acidic catalysts of the prior art a natural amphoteric material can be used as a cheap, readily separable catalyst for this reaction. Accordingly, it is an object of the present invention to provide a novel catalyst for condensations involving carbonyl compounds and aromatic hydrocarbons, phenols and/or heterocyclic compounds such as thiophene. It is another object of the present invention to provide a means for pretreating the novel catalyst to improve the yields. It is a further object of the present invention to provide a means for producing viscous oils or subresinous materials and resins or resinous materials. Other objects and advantages will become apparent from the following description.

In general, the present process involves the use of natural material classified as a marl which heretofore has been used primarily as a water softener. Commercially it is known as "greensand," while its technical designation is glauconite. Glauconite can be used as a condensation agent for condensing active carbonyl compounds and aromatic hydrocarbons, phenols, heterocyclic compounds and the like after drying at 100 to 550 degrees centigrade or after being activated and dried at elevated temperatures. Glauconite or greensand is a naturally occurring deposit found in various localities. Its exact composition is dependent upon the area in which it is found. In general, the larger portion of the glauconite comprises the oxides of aluminum, silicon, iron, potassium and magnesium or calcium. The composition of glauconite usually falls within the limits set forth in the following:

|  | Per cent composition |
| --- | --- |
| $SiO_2$ | 40.00 to 53.61 |
| $Al_2O_3$ | 6.62 to 13.00 |
| $Fe_2O_3$ | 15.16 to 23.43 |
| $FeO$ | 1.32 to 10.17 |
| $MgO$ | 0.95 to 2.97 |
| $CuO$ | 0.57 to 1.97 |
| $Na_2O$ | 0.42 to 2.16 |
| $K_2O$ | 3.49 to 9.54 |
| $H_2O$ | 4.93 to 10.32 |

Glauconite has been characterized by geologists as having the approximate formula, $$KMgFe_3Si_6O_{12} \cdot 3H_2O$$

The naturally occurring product may be used directly after subjecting to a drying treatment sufficient only to remove surface water. On the other hand, a more active material is obtained by heating the glauconite to temperatures of the order of about 200 to about 500 degrees centigrade (390 to 930 Fahrenheit) and preferably at temperatures of about 240 to about 300 degrees centigrade (470 to 575 degrees Fahrenheit). It is to be observed, as shown hereinafter, that after heating at temperatures above about 600 degrees Fahrenheit the activity of the glauconite is reduced.

In general, the glauconite, aromatic hydrocarbon or mixture of hydrocarbons containing aromatic hydrocarbons or phenolic material or heterocyclic compounds or mixtures of the aforesaid materials, and an active carbonyl compound are mixed, charged into a suitable pressure resistant container and the contents heated to about 150 to about 500 degrees Fahrenheit for reaction times of about 0.5 hour to about 16 to about 24 hours and at autogenous pressures. The mixture is then cooled (to room temperature, for example) and the glauconite separated by any suitable means, for example, by filtration.

The catalyst or condensation agent (glauconite) is then washed with a solvent for the condensation product, for example, benzene or the hydrocarbon charge stock. The washings are combined with the liquid reaction product (filtrate when separated by filtration) and subjected to distillation under vacuum. The washing liquid and unreacted charge stock separated, a cut of viscous oil or subresinous amterial obtained and resinous material recovered as a still residue.

Suitable charging stocks include aromatic hydrocarbons per se, aromatic petroleum stocks containing at least 25 per cent mono- or polynuclear, alkylated or non-alkylated, aromatic hydrocarbons in admixture with paraffinic and naphthenic hydrocarbons, phenols or mixtures of phenols or mixtures of hydrocarbons containing phenols, heterocyclic hydrocarbons such as thiophene, thiophene derivatives having at least one replaceable nuclear hydrogen including alkyl thiophenes, alkoxy thiophenes, halogenated thiophenes, etc. or mixtures of the afore-enumerated charge stocks.

The glauconite or greensand may be used in the "as mined" condition after removal of surface water by drying at 100 degrees centigrade or after activation. Activation may be accomplished by treating the marl with mineral acid such as sulfuric acid or hydrogen halide or phosphoric acid in aqueous solution at about 80 to about 100 degrees centigrade for several hours. For example, about 600 parts by weight of glauconite are suspended in about 1800 parts by weight of distilled water containing about 120 parts by weight of concentrated sulfuric acid. That is, the glauconite is treated with an about 1.4 N solution of acid. The suspension is heated and agitated at 80 degrees centigrade for about 3 to about 8 hours, preferably about 5 hours. The liquid is separated from the treated glauconite as by decantation, the glauconite washed until the washings are free from acid and the glauconite dried at elevated temperatures of say 100 to about 500 degrees centigrade (212 to 930 degrees Fahrenheit) and preferably at temperatures of about 200 to about 275 degrees centigrade (400 to 530 degrees Fahrenheit).

The glauconite can also be activated by drying at elevated temperatures of about 200 to about 300 degrees centigrade (400 to 575 degrees Fahrenheit), preferably about 225 to 275 degrees centigrade (435 to 530 degrees Fahrenheit) without acid pretreatment.

Suitable aromatic hydrocarbons for use as charging stocks include benzene, toluene, xylenes, mono-, di-, tri- and tetraalkyl benzenes, naphthalene, mono- and polyalkyl naphthalenes, anthracenes, mono- and polyalkyl anthracenes and other aromatic hydrocarbons and mixtures of aromatic hydrocarbons, paraffins and naphthenes known to the art as aromatic petroleum stocks. For example, aromatic petroleum stocks containing polyalkyl benzenes and known to the art as "Sovasol" #75 may be used. An inspection of "Sovasol" #75 (75 per cent overhead) is the following:

Specific gravity $\frac{60°F}{60°F}$ ----------------------0.8348

A. P. I. gravity $\frac{60°F}{60°F}$ ----------------------38.0

Italian bromine index ----------------------0.0
Per cent aromatics ----------------------60–61.8

A. S. T. M. distillation:   °F.
I. B. P. ----------------------300
5 per cent ----------------------314
10 per cent ----------------------330
90 per cent ----------------------344
EP ----------------------371
Per cent recovery ---------------------- 99
Per cent residue ---------------------- 1

Other aromatic petroleum stocks such as "Sovasol" #74 constituted primarily (80 per cent) of xylenes and aromatic petroleum stocks 1, 2 and 3 constituted primarily of naphthalene, monomethyl and dimethyl naphthalenes; polyalkyl (2–5 alkyl, methyl and/or ethyl) naphthalenes; and alkylated trinuclear aromatic hydrocarbons (mostly anthracenes and phenanthracenes) and alkylated diphenyl, respectively, are suitable charge stocks.

The novel method for producing subresinous and resinous bodies is readily illustrated by the reaction between aromatic petroleum stocks and formaldehyde. It is to be understood that the following examples are typical of reaction conditions employed and products obtained when using any of the suitable charging stocks and any of the suitable active carbonyl compounds.

Aromatic petroleum stock, glauconite and trioxymethylene (paraformaldehyde) were introduced into a pressure resistant container in the amounts indicated in the table. The temperature was raised to about 150 degrees centigrade (302 degrees Fahrenheit) in about 15 minutes while stirring the reaction mixture. The reaction mixture was agitated and heated at about 150 degrees centigrade for an additional 30 minutes, during which period the pressure rose to about 80 to about 100 pounds per square inch gauge. Thereafter the reactor was cooled rapidly to room temperature. The reactor was discharged, the glauconite removed by filtration and washed with benzene or, in some instances, with the aromatic stock. The filtrate and washings were distilled in vacuum and two distillates recovered. One distillate comprised unreacted charge stock and washing liquid and the other comprised the viscous oil or subresinous product. The resin was obtained as a still residue.

The yields in the table are calculated assuming that the aromatic hydrocarbons condense with methylene bridges. Thus, from dimethyl naphthalene it is believed that

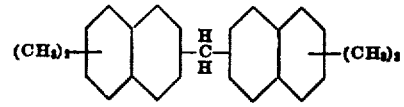

is obtained and from trimethyl benzenes

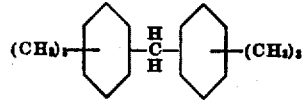

is obtained, as the initial condensation products or, in other words, the condensation products are subresinous to resinous products having the formula

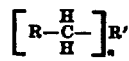

where R and R' are the same or different and = a benzene nucleus with or without substituent groups, fused benzene nuclei with or without substituent groups, diphenyl nucleus with or without substituent groups or a heterocyclic nucleus with or without substituent groups and $n$ is an integer.

dried at temperatures above about 900 degrees Fahrenheit is inferior as a condensation agent

| Run No. | Charge Stock | Per Cent Aromatics | Amt. used | Aromatics, parts by wt. | $(CH_2O)_3$, parts by wt. | Condensation Agent | Condensation Agent, parts by wt. |
|---|---|---|---|---|---|---|---|
| 1 | Aromatic Petroleum Stock #A. | 48.6 | 500 | 243 | 28 | Dried @ 100° C | 125 |
| 2 | ....do.... | 48.6 | 500 | 243 | 15 | ....do.... | 50 |
| 3 | ....do.... | 48.6 | 500 | 243 | 15 | ....do.... | 100 |
| 4 | ....do.... | 48.6 | 500 | 243 | 30 | ....do.... | 100 |
| 5 | ....do.... | 48.6 | 500 | 243 | 30 | Activated dried @ El. Temp. | 100 |
| 6 | ....do.... | 48.6 | 500 | 243 | 30 | Dried @ 250° C. (482° F.) | 100 |
| 7 | ....do.... | 48.6 | 500 | 243 | 30 | Dried @ 540° C. (1004° F.) | 100 |
| 8 | ....do.... | 48.6 | 500 | 243 | 15 | Hornerstown Marl Dried @ 100° C. | 100 |
| 9 | Aromatic Petroleum Stock #B. | 31.5 | 500 | 158 | 15 | Dried @ 100° C | 50 |
| 10 | Aromatic Petroleum Stock #C. | 60 | 500 | 300 | 15 | ....do.... | 50 |
| 11 | ....do.... | 60 | 500 | 300 | 15 | ....do.... | 100 |

| Run No. | Charge Stock | Resin stock, parts by wt. | Per Cent yield based on aromatics | Subresinous material, parts by wt. | Per Cent Resin Stock | Resinous Material, parts by wt. | Per Cent Resin Stock |
|---|---|---|---|---|---|---|---|
| 1 | Aromatic Petroleum Stock #A | 92 | 37.9 | 13 | 15.2 | 78 | 84.8 |
| 2 | ....do.... | 58 | 23.9 | 44 | 75.8 | 14 | 24.2 |
| 3 | ....do.... | 70 | 28.8 | 34 | 48.6 | 36 | 51.4 |
| 4 | ....do.... | 62 | 25.6 | 40 | 64.5 | 22 | 35.5 |
| 5 | ....do.... | 87 | 35.8 | 75 | 86.2 | 12 | 13.8 |
| 6 | ....do.... | 102 | 42.0 | 68 | 66.6 | 34 | 33.4 |
| 7 | ....do.... | 42 | 17.3 | 25 | 59.5 | 17 | 40.5 |
| 8 | ....do.... | 71 | 29.3 | 14 | 19.7 | 57 | 80.3 |
| 9 | Aromatic Petroleum Stock #B | 39 | 24.7 | 7 | 18.0 | 32 | 82.0 |
| 10 | Aromatic Petroleum Stock #C | 33 | 11.0 | 21 | 63.6 | 12 | 36.4 |
| 11 | ....do.... | 32 | 10.7 | 25 | 78.2 | 7 | 21.8 |

| Aromatic Petroleum Stock | Boiling Range °F. | Aromatics Predominantly |
|---|---|---|
| A | 400–500 | Naphthalene and methyl naphthalene. |
| B | 446–507 | Mono- and dimethyl naphthalene. |
| C | 300–375 | Trimethyl benzenes. |

The viscous oils and resins listed in the table had the following boiling ranges:

| Run No. | Viscous Oil Boiling Range, °C. | mm. Hg | Resin Boiling Range, over °C. | mm. Hg |
|---|---|---|---|---|
| 1 | 185–285 | 10 | 286 | 10 |
| 2 | 130–284 | 5 | 285 | 5 |
| 3 | 175–278 | 11 | 279 | 11 |
| 4 | 185–285 | 10 | 286 | 10 |
| 5 | 195–287 | 15 | 288 | 15 |
| 6 | 195–287 | 15 | 288 | 15 |
| 7 | 152–276 | 15 | 277 | 15 |
| 8 | 156–210 | 15 | 211 | 15 |
| 9 | 201–270 | 10 | 271 | 10 |
| 10 | 178–253 | 5 | 254 | 5 |
| 11 | 180–259 | 8 | 259 | 8 |

The data in the table indicate (runs 2, 9, 10) that a mole ratio of $CH_2O$ to aromatic hydrocarbon of 0.3 or greater the yield of resin stock is not effected but that at mole ratios less than 0.3, say 0.2, the yield of resin stock (sub-resinous plus resinous material) drops off rapidly. Furthermore, increasing the amount of active carbonyl compound (formaldehyde) does not affect the total yield of resin stock (runs 3 and 4), nor does increasing the amount of catalyst markedly affect the yield of resin stock (runs 2 and 3). However, the previous treatment of the catalyst does affect the yield of resin stock and the proportion of sub-resinous to resinous material. Thus, considering runs 4, 5, 6 and 7, glauconite dried at lower temperatures or to activated glauconite.

| Run No. | Retreat | Per Cent Yield Resin Stock | Sub-resinous per cent of total | Resinous per cent of total |
|---|---|---|---|---|
| 7 | Dried @ 1004° F | 17.3 | 59.5 | 40.5 |
| 4 | Dried @ 212° F | 25.6 | 64.5 | 35.5 |
| 5 | Activated | 35.8 | 86.2 | 13.8 |
| 6 | Activated by Drying @ 482° F | 42.0 | 66.6 | 33.4 |

It will be observed that the ratio of sub-resinous to resinous products does not vary to any great degree whether the glauconite be dried at 212 or 1004 degrees Fahrenheit. However, glauconite activated by acid treatment and dried within the foregoing range appears to effect an increase in the ratio of sub-resinous products to resinous products. Accordingly, it would appear that a maximum yield of resin stock can be obtained by using glauconite activated by heating at 470–575 degrees Fahrenheit until dried while a lower total yield but maximum ratio of sub-resinous to resinous material is obtained by employing acid activated glauconite. It is preferred to use greensand dried at about 470 to about 575 degrees Fahrenheit.

The foregoing can be summarized as follows: The novel method comprises reacting a condensible material selected from the group consisting of aromatic hydrocarbons, phenolic compounds, heterocyclic compounds and mixtures of non-condensible hydrocarbons and any one or more of the foregoing condensible hydrocarbons with an active carbonyl compound such as the aldehydes (alicyclic or carbocyclic), for example, formaldehyde, acetaldehyde, benzaldehyde, etc. at temperatures of about 150 to about 500 degrees Fahrenheit at autogenous pressures for a reaction time of about 0.5 hour to about 24 hours in the presence of glauconite, preferably activated by drying at a temperature of about 470 to about 575 degrees Fahrenheit. After separation of the reaction products from the glauconite, the reaction products are distilled under vacuum to remove unreacted reactants and wash fluid and to obtain sub-resinous material of the nature of viscous oil as a distillate and a still residue of the nature of a thermoplastic resin.

We claim:

1. A method for producing sub-resinous and resinous materials which comprises reacting aromatic hydrocarbons with formaldehyde in the absence of a substantial amount of water, in the presence of glauconite, at temperatures of about 150 to about 500 degrees Fahrenheit and at autogenous pressures.

2. A method as set forth and described in claim 1 in which the glauconite is activated by being previously subjected to temperatures of about 470° to 575° F.

3. A method for producing sub-resinous and resinous materials which comprises reacting thiophene with formaldehyde in the absence of a substantial amount of water, in the presence of glauconite, at temperatures of about 150 to about 500 degrees Fahrenheit and at autogenous pressures.

4. A method as set forth and described in claim 3 in which the glauconite is activated by being previously subjected to temperatures of about 470° to 575° F.

5. A method for producing sub-resinous and resinous materials which comprises reacting a cyclic compound having an active nuclear hydrogen selected from the group consisting of aromatic hydrocarbons and thiophenes with formaldehyde in the presence of glauconite at temperatures of about 150 to about 500 degrees Fahrenheit at autogenous pressures and in the absence of a substantial amount of water.

6. A method as set forth and described in claim 5 in which the glauconite is activated by being previously subjected to temperatures of about 470 to about 575 degrees Fahrenheit.

HOWARD D. HARTOUGH.
JOHN J. SARDELLA.

REFERENCES CITED

The following references are of record in the file of this patent:

UNITED STATES PATENTS

| Number | Name | Date |
|---|---|---|
| 1,970,204 | Stockton | Aug. 14, 1934 |
| 2,200,763 | Anderson et al. | May 14, 1940 |
| 2,217,014 | Grosse et al. | Oct. 8, 1940 |
| 2,432,991 | Hartough et al. | Dec. 23, 1947 |

OTHER REFERENCES

Nutting, pages 80–82, Refiner and Natl. Gasoline Mfr., Mar. 1933, vol. 12, No. 3.